April 10, 1973 J. F. ZALESKI 3,726,717
FLAT CELL AND METHOD OF MAKING
Filed Aug. 14, 1970 5 Sheets-Sheet 1

INVENTOR.
John F. Zaleski
BY
ATTORNEY

April 10, 1973    J. F. ZALESKI    3,726,717
FLAT CELL AND METHOD OF MAKING
Filed Aug. 14, 1970    5 Sheets-Sheet 2
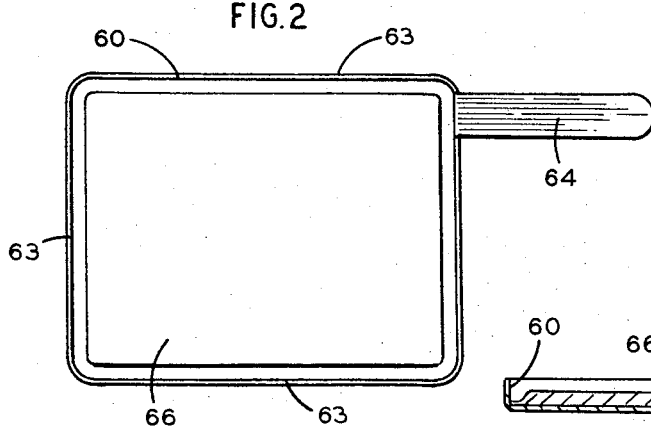
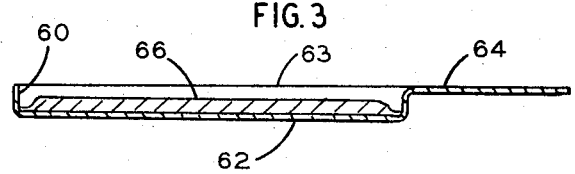
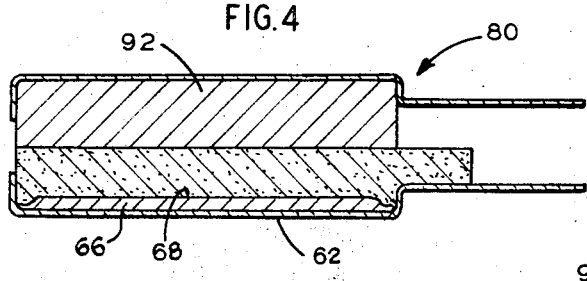
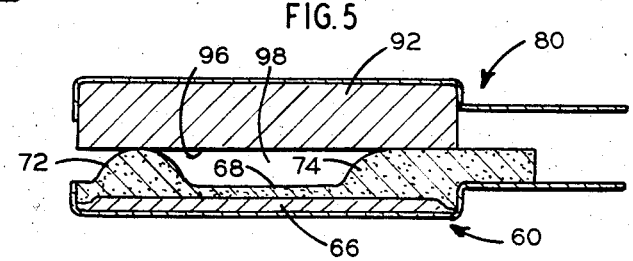
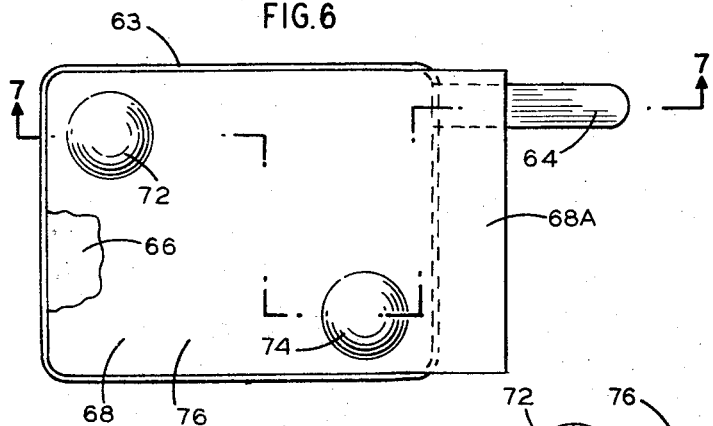
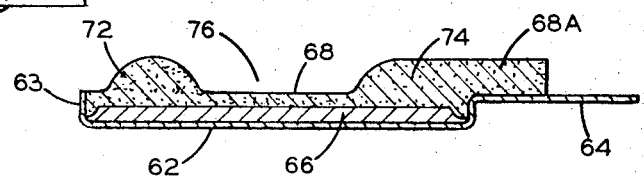

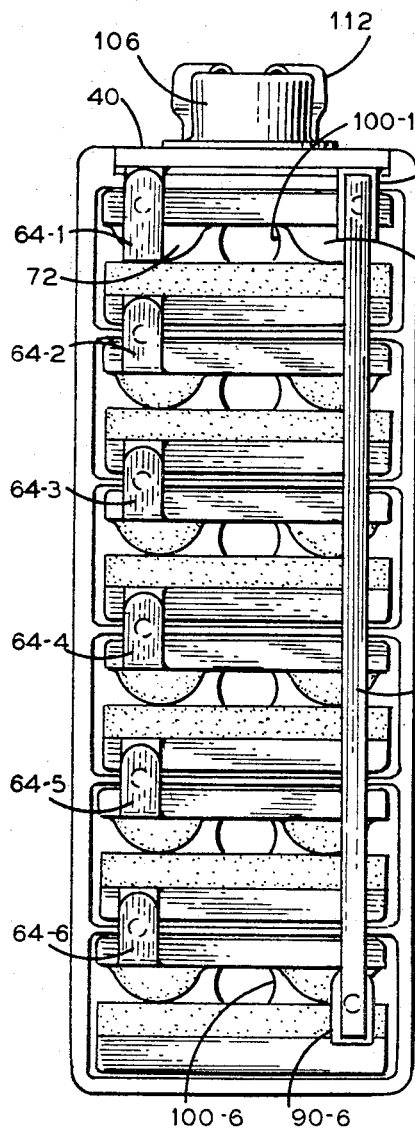
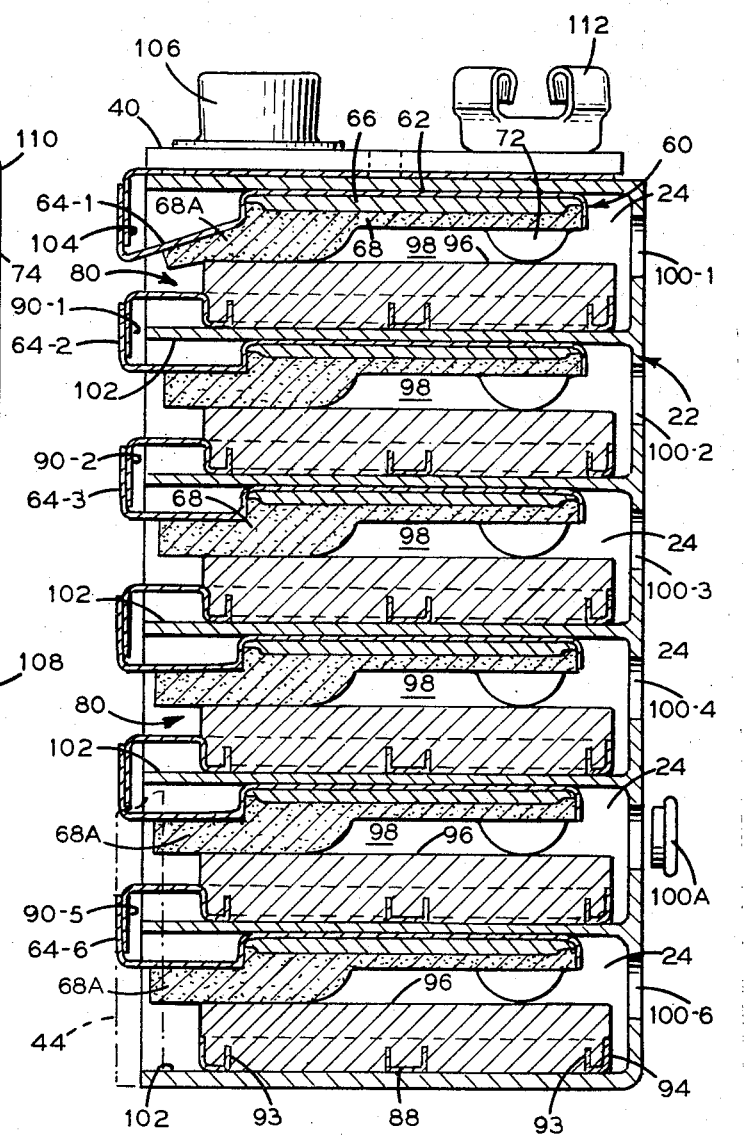

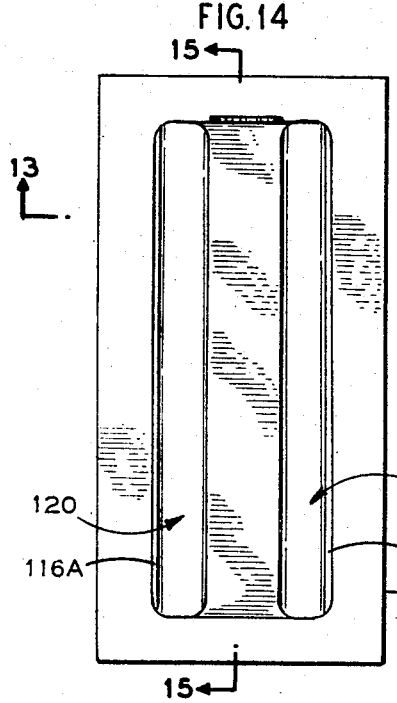
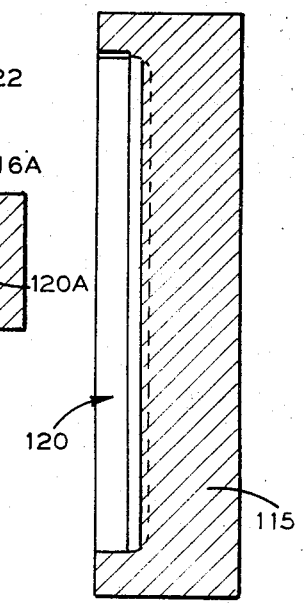
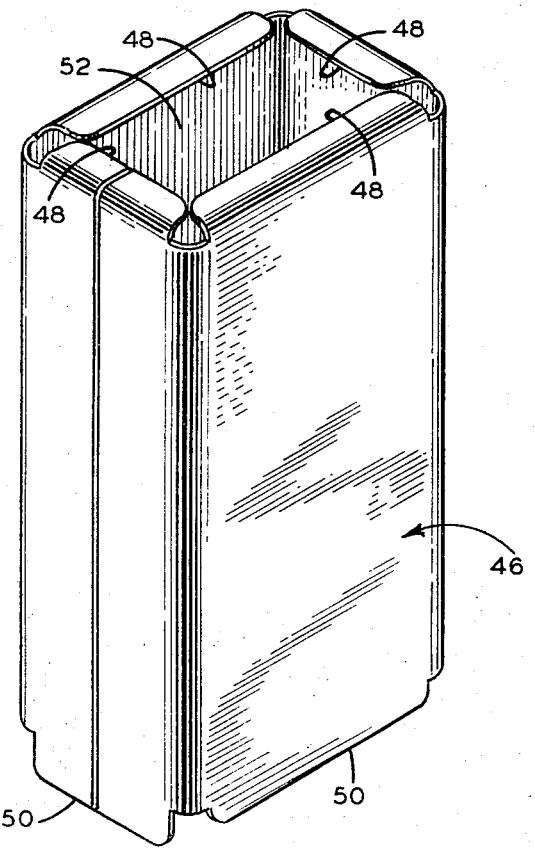

United States Patent Office 3,726,717
Patented Apr. 10, 1973

3,726,717
FLAT CELL BATTERY AND METHOD
OF MAKING
John F. Zaleski, Pleasantville, N.Y., assignor to P. R.
Mallory & Co., Inc., Indianapolis, Ind.
Filed Aug. 14, 1970, Ser. No. 63,767
Int. Cl. H01m 1/02
U.S. Cl. 136—111                                11 Claims

ABSTRACT OF THE DISCLOSURE

A multi-cell battery having a plastic casing shaped as a hollow regular parallelepiped with a long dimension, and initially open across a width dimension, and having a plurality of parallel cellular spaces in the depth dimension to define several cells to accommodate anode and cathode electrodes of rectangular shape for maximum space utilization of components in said cellular spaces including porous spacer, depolarizer and electrolyte, with a unitary closure element to cover and close and seal all of the cellular spaces, and prevent internal shorting, with the plastic casing walls being characterized to be air pervious to permit breathing venting and to prevent pressure build-up in the cells and to retain design format and prevent cracking of manganese dioxide depolarizer and consequent increase of internal battery resistance.

---

This invention relates to an alkali battery and is particularly directed to a battery consisting of several cells, with the respective electrode assemblies for each cell disposed in a separate compartment in a case or housing for the assembled battery of cells, and the entire battery sealed in a manner to seal each cell.

One of the problems confronting the battery industry has been to produce, specifically, a 9-volt cell within a definitely limited volumetric space of specific dimensions, imposed by requirements of commercially accepted standards.

One advantage of a 9-volt cell that makes it commercially desirable, is that a related circuitry can be composed of relatively inexpensive elements that have already been developed for operation from a 9-volt source.

Because of the non-availability of a satisfactory 9-volt battery, it has been necessary to utilize a battery of lesser voltage but with corresponding power capacity, and because of that lesser voltage it has become necessary to design and utilize circuit components that are relatively more expensive, and the circuitry more complex, than those components that could be utilized, with simpler circuitry, energized from a 9-volt source.

The difficulties encountered in the proir commercial 9-volt batteries have been difficulties that arose during operation of the battery, such as development of internal pressure resulting from the generation of gasses as by-products of electro-chemical inter-action during operation of the cell, with consequent bulging of the casing, and with consequent disturbance of the initial spacing between electrodes and other components in each cell due to such pressures and related differential pressures within the cell. Such pressures have caused fracturing of certain components within each cell, such as manganese-dioxide depolarizer materials, with a consequent increase in the internal resistance of the cell due to gaps established in the conductive material of the depolarizer, resulting from such fractures.

A further consequent disadvantage from the development of such internal pressure in the cell has been the disturbance of the usual seal for the cell, with consequent leakage of the alkaline electrolyte from its proper location within the cell, to regions from which the electrolyte would normally be barred by a sound and healthy seal, but into which regions the caustic electrolyte can manage to seep when a seal is disturbed and shifted from its normal effective position and condition.

The lack of a satisfactory 9-volt cell within the design limtis normally imposed by commercial space requirements have thus contributed to an economic loss in the sense that more expensive circuitry and related component elements have been required, with a consequent increase of the possibility of erratic and faulty operation of a device with such increased number of components in the circuitry.

The primary object of this invention, therefore, is to provide a satisfactory commercial battery of 9 volts within specific structural design and dimensional limits already established and heretofore imposed by commercial conditions and requirements.

A further object of the invention is to provide an economical battery of 9 volts that would provide a satisfactory operation to obviate the difficulties and disadvantages that have made prior batteries of that voltage inadequate and insufficient to such an extent that they have been substantially eliminated in commercial service with small electrical and electronic devices.

The battery designed in accordance with this invention serves to provide a source of 9 volts and employs six cells capable of respectively generating a voltage of one and one-half volts per cell.

In order to take advantage of symmetrical arrangements of elements in an electric cell, a circular cross section has been conventionally employed, to construct the cell as a circular prism. However, since the area of a circle is less than the area of a square based on the diameter of the circle, the corner spaces of such a square or of a rectangle are lost and are not available to accommodate the extra working material and elements of a cell that could be accommodated in the same general external storage space dimensions as the circular cell.

In order to obtain full utilization of such corner spaces that are lost in a round cell structure, the cell that is constructed in accordance with this invention utilizes a rectangular space to accommodate the chemical materials and electrode elements. The additional corner spaces made available represent a substantial increase over the area that is available in a circular section, and such corner spaces thus permit inclusion of a larger amount of working chemicals within each cell where such corner spaces are available and utilized.

Thus, another object of the invention is to provide a cell structure designed to be accommodated in the volumetric space of a chamber having a rectangular cross section.

Because of the limitations of physical dimensions imposed upon a nine volt cell, by commercial design limitations, the size and space dimensions of cylindrical cells are limited. By utilizing a cell of rectangular section, for use in a nine volt battery, space dimensions of the chamber for each of the six cells of such a battery are relatively larger, but even then each cell space has a dimension of only approximately 0.256 inch width by 0.560 inch section length and 0.900 inch space chamber depth. Within this chamber must be disposed an anode, a cathode, a depolarizer, and a spacer, with a liquid electrolyte to be in part absorbed by the spacer and the depolarizer material. All of those elements must be fitted into the volumetric space for one cell and the cell structure then sealed, with a conductive tab from each electrode extending through the sealing material for connection to an external circuit. The spacer consists of a non-woven fabric of a cotton type material of absorbent porous and resilient characteristics. One commercial material found suitable is made by Kendall Mills, identified by its trademark "Webril."

One of the problems that arises in cells of this type is the need to prevent internal short circuiting between the electrodes by the electrolyte. That is one function of the porous separator. In the present case, one of the features of the invention is to provide for covering and protecting the two tabs or connecting strips from the electrodes to the external circuit, so short-circuiting action between the two tabs will be prevented between the two tabs. That protection and isolation of the two tabs to prevent a short circuit between them through the electrolyte, is provided by forming the closure seal for the cell so that the closure seal will extend inwardly into the cell to cover and protect the tabs to a pre-determined depth into the cell, and also so the seal material will extend slightly into the edge of the spacer, so the seal material and the spacer will provide a substantially continuous barrier, of the spacer and the absorbed and hardened sealing material along the outer top edge of the spacer, in the space path between the two tabs of the electrodes.

Thus another object of the invention is to provide a complete barrier between the electrodes by the absorbent spacer and the portion of sealing material absorbed by the spacer, when that sealing material is applied to close the cell chamber after said cell is completely assembled.

In the manufacture of a battery of this invention, after the electrodes and the spacing material between them are disposed in a cell, there are two problems encountered in filling each cell with electrolyte. The first problem is that of filling the cell fast so too much time shall not be needed in waiting for the electrolyte to fill the space and to be absorbed by the spacer; and the second problem is actually to provide initial filling space for the electrolyte to be accommodated. Those problems are solved in the present invention by compressing the spacer from its initial normal thickness or depth to a fraction of its normal thickness, while assembling the electrodes and the spacer in the dry state in the cell chamber. The compressed spacer provides space for the electrolyte to be introduced freely, after which the spacer absorbs the electrolyte and expands to its normal original thickness. By thus providing initial filling space, the production problem of fast filling is also solved.

However, since it is desirable to maintain the two electrodes in normal spaced relation, so they will be in their outer-most relative positions to engage the side surfaces of the cell walls, the compression of the spacer must be done in such manner that the spacer will still provide appropriate interelectrode spacing, to keep the two electrodes spaced in desired distance apart while at the same time providing the free open space for the electrolyte to be freely and quickly inserted. To accomplish this double condition of providing free space to receive the electrolyte quickly, while at the same time holding the two electrodes separated, the spacer is compressed over the major part of its area, while leaving at least two small separated regions unpressed and of original height, so they may then serve as small spaced bosses to hold the two electrodes separated to provide a free space between them to receive and accommodate the electrolyte to be introduced.

Thus, another of the important objects of the invention is to provide the spacer in such form and condition during the manufacturing operation, that it will serve to hold the two electrodes separated, and thereby serve to provide a free space to permit the electrolyte to be introduced freely and quickly, without the need for waiting for the electrolyte to be absorbed by the spacer. Thus, assembly time is saved during production.

Another feature is the provision of anchoring means for the depolarizer that permits almost universal freedom of adjustable movement of the depolarizer material during expansion due to absorption of chemical elements during operation.

The foregoing and other objects and features, and the general construction of the individual components including the housing and the elements within each cell, and the construction and the manner of assembling of the components of the complete battery, are described in more detail in the following specification, and are illustrated in considerable detail in the accompanying drawings, in which FIG. 1 is a schematic exploded view of a battery constructed in accordance with this invention with FIG. 1A indicated at FIG. 1;

FIG. 2 is a plan view of a shallow cup support for a layer of an anode material, and embodies an extending tab to serve as an electrode terminal;

FIG. 3 is a longitudinal sectional view of the anode support and material of FIG. 2;

FIG. 4 is a longitudinal sectional view indicating schematically the disposition of a cathode assembly and an anode assembly with spacer and depolarizer engaged during normal operation of a cell;

FIG. 5 is a view similar to that of FIG. 4, but with the spacer on the anode compressed to provide free space to receive and accommodate a change of electrolyte ;

FIG. 6 is a plan view of an anode assembly with the spacer compressed to leave two spaced spacing bosses;

FIG. 7 is a sectional view of the assembly in FIG. 6, taken along line 7—7 of FIG. 6;

FIG. 11 is a longitudinal, vertical sectional view through the battery, showing the electrodes of the several cells in place, and the intercell connections made, with one end connection to one battery terminal;

FIG. 12 is a plan view of the battery, with elements assembled and disposed in their cellular compartments, and electrode terminal tabs connected intercell and to the battery end terminals;

FIG. 13 is a transverse sectional view along lines and plane 13—13 in FIG. 14, of a trough mold for forming a top epoxy seal on the battery, after dry assembly as in FIGS. 11 and 12;

FIG. 14 is a plan view of the trough mold; and

FIG. 15 is a longitudinal side sectional view along lines and plane 15—15 of FIG. 14.

Generally speaking, the battery disclosed hereinafter comprises a unitarily molded case which has the bottom integrally formed and has an initially open ended top. The battery case is molded so as to provide unitarily formed partitions extending up from the bottom, making the individual cell compartments for holding the cell components such as electrodes, electrolytes and spacer materials therein. Each cell thus formed will comprise a complete power unit capable of being interconnected with its neighbor cell so as to supply a cumulative, required electrical output. In the battery case the partitions above described, end slightly below the top portions or lips of the case to form a volumetric space or recess into which a substantially tight, fixed sealing means can be introduced, such as an epoxy. The integrally unitized and novel construction comprises a multiplicity of individual cells of completely controlled electrical parameters so as to obtain a pre-determined battery output. The invention thus provides a considerable advance to the primary battery art wherein uniformity and automated procedures can be more efficiently and inexpensively provided, but wherewithal the quality of construction is improved and the efficiency and capability of the battery enhanced.

Figure 1:
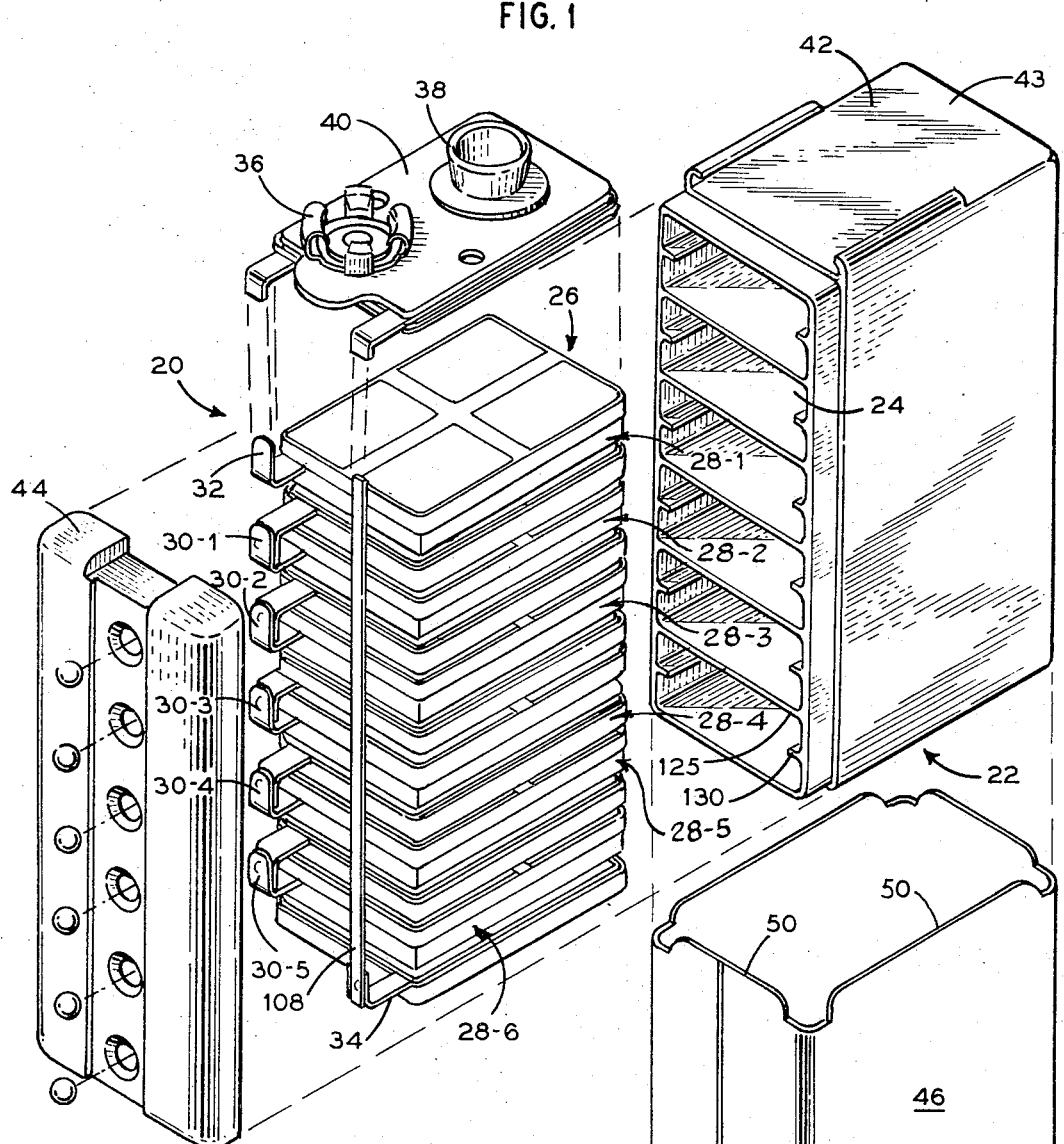
FIG. 1A is a perspective view of a metallic casing for encircling the battery of FIG. 1, and is shown in more detail on its sheet of drawings.

As generally shown in FIG. 1, a multi-cell battery 20, constructed in accordance with this invention, comprises a casing or housing 22 provided with a plurality of separated and isolated chambers 24 into each of which an assembly 26 of paired co-operative electrodes is inserted in an assembly manufacturing operation. In the arrangement here shown, six cells 28–1 through 28–6, respectively, are suitably connected in series by consecutive inter-cell tab connections 30–1 to 30–5, respectively, with two end terminal tabs 32 and 34 electrically connected to appropriate external terminals 36 and 38 on a supporting assembly plate 40 which is to be supported in finished assembly in an outer pocket 42 on an end wall 43 at one end of the housing 22.

After the cell assembly 20, in dry condition, is inserted in said battery housing 22 and the external terminal plate 40 is assembled on said housing 22, the housing 22 is then appropriately sealed and provided with a sealing top cover 44, before introducing electrolyte into the several cells through the bottom floor.

Figure 1A:
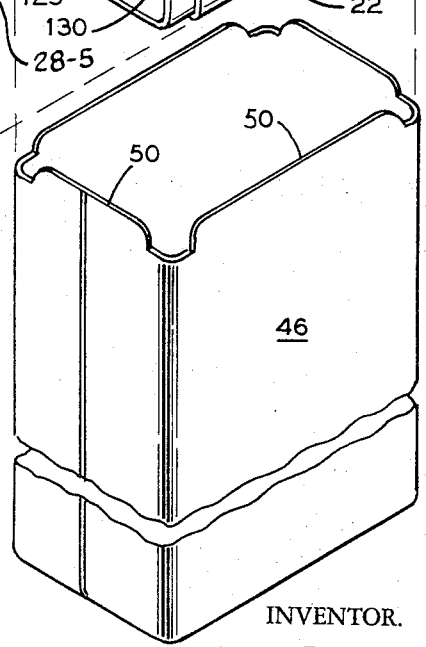

When the housing 22 is thus assembled with the terminal assembly plate 40, and provided with said upper sealing cover 44 and then appropriately sealed at the bottom, as will be further explained below, the sealed housing 22, containing all of the cell elements and supporting the terminal assembly plate 40, is inserted in a protective metal jacket 46, shown in FIG. 1A, which is provided with appropriate crimped elements 48 at one end, that are pre-crimped before assembly, and also provided at the other end with postcrimping flange elements 50, to be crimped after the insertion of the complete battery housing 22 into the jacket 46. The dimensions of the crimped flanges 48 and 50 are such as to provide an open space 52 at either end sufficient to accommodate the external terminals 36 and 38, on terminal plate 40, free of engagement with any part of the crimped flange elements 48 or 50 of the metal jacket 46.

The electrodes for each cell may now be considered.

The manner in which the anode and spacer assembly is constructed is shown in FIG. 2 through FIG. 7.

As shown in FIGS. 2 and 3, the anode electrode consists of a rectangular metal cup 60 having a full closed bottom floor 62, with side walls 63 and an extending tab 64 to permit the anode to be electrically connected to an external circuit.

As shown in FIGS. 2 and 3, a quantity of anode powder mix 66 is placed in the cup 60 to cover the floor 62 and is then pressed into shape between the walls 63 to occupy a minimum depth in the cup 60, in order to provide room for an overlay of spacer material 68 to be compressed onto the anode powder mix 66.

The spacer serves as a physical spacer and ion transfer medium between the anode and the cathode electrodes of the cell, and is generally porous and absorbent to the electrolyte to be used in the cell. For the purpose of the present invention, the spacer is also highly compressible.

The spacer material 68 is highly porous, in order to serve to receive and hold a portion of the electrolyte to be utilized in the cell, and is also substantially compressible in its dry state. That compressible characteristic of the spacer is utilized to make extra space available for receiving the electrolyte when initially introduced, thereby to permit the cell to be expeditiously filled, without the need to wait until the electrolyte is absorbed by the spacer. Thus, assembly time during manufacture is reduced.

However, the spacer has another function to perform. It must, as a separator, also physically space and separate the anode and the cathode electrodes to a predetermined maximum spacing within the cell chamber, to accommodate the necessary amount of chemical materials at the electrodes, and the charge of electrolyte.

FIGS. 4 and 5 show the manner in which a layer of spacer material is placed on the anode powder mix 66 and then compressed over the area of the spacer except for two small areas 72 and 74 on which two bosses 72 and 74 are formed, here shown semi-spherical. The treatment of the spacer 68 in this manner serves two purposes. First, the volumetric space 76, over the top area of the spacer 68 between and around the two bosses 72 and 74, provides free space into which the electrolyte will be able to flow freely when it is later introduced into the cell. The second benefit derived from that formation of the spacer is that the two bosses 72 and 74, left uncompressed, remain available to act as spacers, as in FIG. 5, to accomplish the usual spacing function between the anode and the depolarizer material of the cathode, until and while the electrolyte is introduced into the interelectrode space in each cell.

Figure 8:
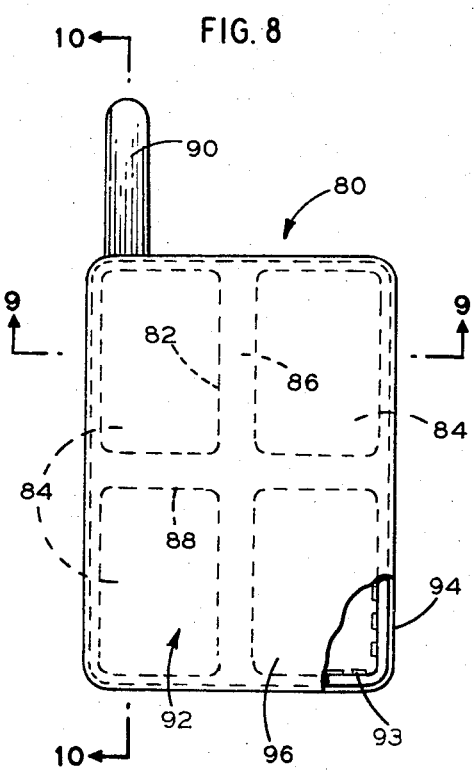
FIG. 8 is a plan view of a shallow cup cathode support and electrode, with a layer of depolarizing material in place.
Figure 10:
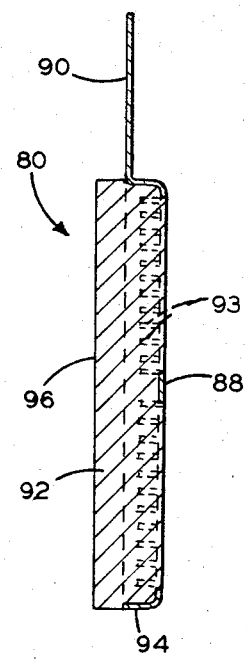
FIG. 10 is a vertical sectional view along plane 10—10 in FIG. 8.
Figure 9:
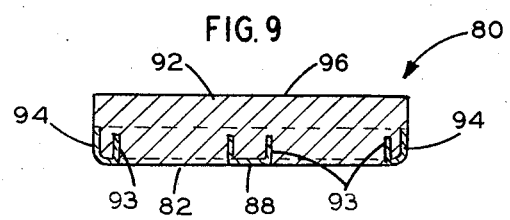
FIG. 9 is a transverse sectional view along plane 9—9 through the assembly in FIG. 8.

In FIGS. 8, 9 and 10, a shallow metal cathode cup 80 is shown provided with a floor 82 of crucifix form, shaped by the removal of four cut-outs 84 to leave a longitudinal rib 86 and a transverse rib 88. A tab 90 of the metal cup 80 provides an electrical connector for connection to an external circuit, and pressed-up tangs 93 along the borders of the cut-outs 84 assist in holding a depolarizer pellet 92 shown compressed into the cup 80 to fill all of the space in the cup 80 including the spaces in the windows or cut-outs 84 and further to extend slightly above the shallow cup 80 to also grip the tangs 93 and the top border edges 94 of the cup.

In assembly, the pellet and cup consolidation of FIGS. 8, 9 and 10 is disposed with the pellet 92 to rest against the spacer 68, as in FIG. 5. With the spacer treated as shown in FIGS. 6 and 7, a depolarizer material top surface 96, FIG. 9, will sit against the top surface points of the bosses 72 and 74 on the spacer material 68 of FIG. 5 and thus provide a free space 98 between the spacer 68 and the depolarizer 92, into which an electrolyte may be introduced with a minimum of time so that the battery may be assembled in relatively short time for maximum manufacturing economy.

As shown in FIG. 11, each cell assembly is shown in position in its cell compartment 24. The cell assembly consists of one anode-spacer assembly 60 and one cathode-depolarizer consolidation 80. The anode-spacer assembly consists of the arrangement shown in FIGS. 6 and 7, and the cathode-depolarizer consolidation 80 corresponds to that shown in FIGS. 8, 9 and 10. As shown in FIGS. 5 and 11, a spacer 68 presses against a depolarizer top surface 96 to leave a temporary increased empty free space 98 between the spacer and the depolarizer to permit the operating electrolyte to be introduced into that free space quickly, without having to wait while the electrolyte is being absorbed by the absorbent spacer 68.

Before the electrolyte is introduced into the battery cells, they will all be saled at the top of the plastic housing 22 as shown in the exploded view in FIG. 1. The electrolyte will be introduced into the several cells through bottom openings 100–1 to 100–6 inclusive, of the respective cell chambers. FIG. 11 serves to illustrate the disposition of the electrode assembly in each of the cell chambers, with the spacer 68 pressing the depolarizer to its proper position to the back side wall 102 while at the same time providing the large open space 98 for the electrolyte to be subsequently introduced. FIGS. 11 and 12 show the manner in which the tabs of opposite polarity electrodes in adjoining cells are physically engaged to be electrically welded during manufacturing assembly to provide good electrical contact. The tab 90–1 of the depolarizer cathode cup 80 is connected to the tab 64–2 of the anode cup 60 in the next adjoining cell. The tab 64–1 of the first cell of the battery is suitably connected to an external tab 104 which is, in turn, connected to the external positive terminal 106 at the end of the battery casing.

FIG. 12 shows a plane top view of the battery of FIG. 11, in dry state, before the electrolyte is inserted into each cell. This view in FIG. 12 shows the arrangement at which the final tab 90–6 from the depolarizer cathode consolidation in the sixth cell is electrically joined by welding or equivalent operation through a connecting strip 108 to a terminal tab 110 connected to the second terminal 112 on the terminal plate 40 at the front end of the battery housing 22.

After the assembly is completed, as shown in FIGS. 11 and 12, the top open ends of the several cells are arranged to be closed and sealed, by a single closure as a unit, with a suitable epoxy, by dipping the entire assembled battery as shown in FIGS. 11 and 12 inverted, into a suitable mold 115, as shown in FIGS. 13, 14 and 15.

When the battery is assembled as shown in FIGS. 11 and 12, it is dipped into a well 120, in said mold 115 (FIGS. 13, 14, and 15), containing a liquid thermoplastic or an epoxy resin, or any other suitable sealing material which will cure and harden to form a complete cover over the open ends of the entire battery casing, to close and seal all of the separate compartments as cell chambers, and also to extend slightly into each of said cell chambers to provide a sealing arrangement for each pair of tabs in each cell chamber, by providing a coupling and sealing arrangement with each spacer in each cell, to establish a continuous barrier of spacer and epoxy.

Among the problems that are encountered in the design and manufacture of a multi-cell battery of this type and size, are the problems of preventing chemical and electro-chemical action between a caustic electrolyte, such as potassium-hydroxide (KOH) employed in this battery, and the electrodes. Of course, the principles of design employed herein are not limited to the dimensions of the battery cells herein considered, but are especially rigorous in the case here where the cells have small dimensions imposed upon the specific construction, as here considered and illustrated. For example, the outer dimensions of the completely assembled battery as indicated in FIG. 1A are approximately 1.025 inches in depth, 1.645 inches in width, and 1.8 inches in overall length. The individual compartments in which the components for one cell are disposed are correspondingly small.

The dimensions of the depolarizer cathode cup 80 are approximately 0.75 inch in length and 0.53 inch in width, and when the windows 84 are cut out from that depolarizer cathode cup 80, the cup 80 provides a relatively small confining rim to hold the depolarizer pellet which is supported on that depolarizer cathode cup 80.

Similarly, the anode cup 60 is of corresponding dimensions, although there are no windows or cut-outs in the anode cup which supports the spacer.

The spacer 68 is generally a cotton material that serves as an insulating spacer between the anode and the cathode elements, and it is utilized because of its absorbent quality to absorb and hold the electrolyte in active position between the cathode and the anode. That same absorbent characteristic of the cotton spacer 68 is utilized to provide one of the features of this invention, which is the absorption of the epoxy closure 44 to a small depth into and along the top edge of the spacer 68, thereby to establish an insulating barrier between the anode and the cathode, and particularly between the two metal tabs 64 and 90 that extend from the anode and the cathode cups, respectively, for connection to an external circuit. The manner in which that feature is established and provided is illustrated in FIG. 11, in which the spacer 68 has an upper extension 68A which reaches almost to the plane of the upper edge of the housing 22. The partition walls are similarly slightly short to establish short lips 125 for gripping the closure adjacent the upper edge of the housing.

The partition walls thus reach the top edge of the housing with short fillets that constitute the lips 125 to be engaged by the epoxy in fluid state as the surface tension of the fluid epoxy forms a meniscus along each wall surface engaged thereby. To provide further anchorage for the epoxy cover, intermediate ribs 130 are formed between the partition walls, and the upper edges of these ribs serve also as lips to be engaged and gripped by the curing epoxy.

After the assembly of the elements of the several cells, as shown in FIGS. 11 and 12, into casing 22, the casing top is rested, inverted, on two ledges 116 and 116A, of mold 115, disposed parallel to and along two fluted troughs 120 and 120A filled with heated liquid epoxy.

As schematically indicated in FIG. 13, the metal tab intercell connections 64-1 to 64-6, and the long terminal strip 108 are dipped into the epoxy to a limited depth in troughs 120 and 120A, sufficient to form the epoxy to a level that will cover those connections and form the unitary closure 44 shown in FIG. 1, and indicated in dotted line in FIG. 11. At the same time, the top outer edge of each spacer will engage the epoxy and absorb the epoxy to a limited depth due to the curing and hardening action of the epoxy. Also, at the same time, the epoxy will bond to the upper edge lips and slightly inward due to surface tension, to engage and bond to the walls and partitions between the compartments.

The subsequent curing and solidification of the epoxy that joins with each of the spacer units 68 in the several cells enables each spacer to serve as a full barrier between the tab 64 of the copper anode cup 60 and the tab 90 of the cathode cup 80, as is evident from consideration of the cells so illustrated in FIG. 11. The provision of the spacer and epoxy closure as a continuous barrier between the tabs is an important feature of this invention, and serves to prevent bridging or short-circuiting between the tabs that would otherwise reduce the effectiveness in each cell.

Another feature of the invention is the provision of the additional holding and conducting means between the cathode cup and the depolarizer pellet that is consolidated with the cup. As shown in FIG. 8, the depolarizer cup 80 is formed with the four window cut-outs 84 in order to impart greater flexible adaptability to the cup, to enable the cup to respond to varying dimensional adjustments in the pellet as the pellet absorbs electrolyte and byproducts of the chemical and electro-chemical action in the cell. The depolarizer pellet acts somewhat as a sponge, and its expansion during operation may be in any one or in all directions, which cannot be predetermined. The supporting cup for that pellet must therefore permit physical readjustment freely to the expansion of the pellet, while at the same time retaining electrical contact with the pellet, since the cell current must travel through that pellet.

Since the pellet is a conductive element in the circuit of the cell, its resistance becomes an important factor that must also be kept low. Conventionally, carbon dust, or graphite, is mixed in with the depolarizing manganese-dioxide from which the pellet is formed, thereby providing a beneficial effect in reducing the internal resistance of the pellet.

As the depolarizer pellet expands, there is some tendency for it to bulge, and perhaps to become somewhat slightly concave in its lower surface of engagement with its supporting cup, due to the confining action at the rim of the pellet, if such confining action does not have some inherent resiliency. Also, there is a tendency for the pellet to crack, due to differential stresses, and thereby introduce additional resistance into the circuit through the pellet, which then represents an increase in resistance of the cell and a corresponding reduction in the efficient operation of the cell.

One additional feature of this invention is to provide a construction in the depolarizer cup 80 to reduce such tendency to crack, and to increase both the physical reinforcement for the pellet and to also continue and assure electrical contact with the pellet in such manner as to provide many parallel conductive paths through the pellet, which paths, being in parallel, will all combine to establish a collective low resistance path through the pellet.

That feature is provided herein by forming the cup 80 to have a continuous series of upstanding tangs or tabs 93 pressed-up around the outline of each window 84, so the tangs will penetrate into the pellet 92 when it is positioned in the cup and then compressed into the cup for a tight physical and electrical consolidation. Those tangs 93 serve as additional holding elements in the pellet 92, while permitting free readjustment of the pellet in the several regions adjacent to the windows and in the peripheral border of the pellet, since the holding tangs are individually quite flexible about a very short line that is practically a point support, as a universal pivot. The flexibility of the many individual small tangs to adjust themselves independently with adjustment of the pellet permits unlimited variations of adjustment in the pellet due to any expansion of the pellet in the operation of the cell. At the same time, the continued electrical contact of the tangs 93 with the pellet provides good electrical contact of extremely low resistance due to the large number of tangs electrically in parallel between the cup and the pellet.

After the unitary epoxy cover cures and seals the top of the several cells, they are ready to be filled with the electrolyte, which is introduced into each cell through the respective holes 100–1 to 100–6. The previous compression of the spacer 68 now provides the spaces 98 to permit fast introduction of the electrolyte. After the proper volume of electrolyte is introduced into the several cells, the holes 100–1 to 100–6 are sealed with a suitable plastic plug 100A which is bonded to the plastic casing material as a hermetic seal, and the terminal plate 40 is anchored to the housing. The battery structure is now ready to be encased in the metal casing 46 shown in FIGS. 1 and 1A.

The flanges 50 at both ends of the metal casing 46 tend to hold the plastic battery casing in position within the metal casing. When it is assembled, the two terminals 36 and 38 on the terminal plate 40, shown in FIG. 1, are located in the central space between the flanges 50 with sufficient spacing from them to be insulated against any short-circuiting action.

The structural arrangement of the various features of construction and of assembly as disclosed herein provide a highly efficient cell of considerable capacity for the small dimension which has been indicated. In addition to the structural features which permit an increase in the amount of chemical elements for the space available, the construction of the supporting cup for the depolarizer is made to provide a high degree of resistance that will enable the depolarizer to expand as it absorbs the evolutionary products of the cell during operation, while at the same time maintaining substantially constant and uniform electrical contact with the cup.

With the construction shown, maximum surface area of the elements and maximum volume of the chemical components are made available within the limited space permitted.

An important feature herein is the provision of a plastic housing that can breathe and thereby avoid the accumulation of internal gas pressures. The plastic material is made sufficiently thin for the walls to be self-sustaining while having minimum thickness, all of which solves several problems, including the actual formation of the plastic housing and its removal from the forming mold, and making available maximum volumetric space for the cell components.

The material employed for this purpose is an ABS plastic consisting of an ultra high impact material in the styrene family, and is commercially available as a B. F. Goodrich product under the brand name "Abson." It comprises a family of copolymers of acrylonitrile, butadiene, and styrene.

This material when made in the thin wall sections, as previously indicated, is gas permeable, but does not permit passage of the potassium-hydroxide electrolyte. The epoxy that is used must provide and establish and maintain a good bond to the plastic material of the housing and its exotherm value must not exceed a structural temperature limit of the casing that would tend to deform the case.

In the modification illustrated here, the anode cup is shown as copper. The cathode cup which supports the depolarizer may be made of nickel, steel or nickel-plated steel.

The resistance value of the battery is maintained relatively constant, in spite of physical variations in the dimensions of the manganese-dioxide depolarizer during operation of the cell, by the construction of the cup for supporting the depolarizer, which provides an extremely flexible and adjustable support while at the same time maintaining a large number of electrical connections between the cup and the depolarizer through the many tangs of the cup, to provide a large number of low resistance electrical paths between the cup and the depolarizer.

By the construction and arrangement of elements as disclosed herein, the many problems encountered in manufacturing small cells are solved to a remarkable degree of commercial adequacy. It will be clear that modifications and dimensional changes may be made within the spirit of the invention without departing from the spirit and scope of the claims.

What is claimed is:

1. A battery comprising:
   a box-like molded plastic case having a chamber substantially of rectangular prismatic form defined within rectangular wide side walls and narrow end walls for receiving rectangular anode and cathode electrodes with a depolarizer and an electrolyte to constitute an electric cell, and formed to be initially open for free insertion of said electrodes and depolarizer, wherein said plastic case:
      (a) is chemically and electronically inert to said electrolyte and depolarizer;
      (b) is sealed with a unitary seal across said open end after insertion of said electrodes and depolarizer;
      (c) has an opening in a wall other than said unitary seal for permitting introduction of said electrolyte;
   an anode electrode disposed parallel to one side wall, wherein said anode consists of a shallow cup and a quantity of metallic powder compressed therein as a flat pellet;
   a cathode electrode spaced from said anode electrode and disposed parallel to said other side wall;
   a depolarizer disposed to be supported on end with said cathode electrode;
   a spacer disposed on said flat anode pellet and compressed over less than its full area to embody a plurality of spacer elements in full height to engage and to hold said depolarizer in spaced relation to define a limited initially empty free space between said spacer and said depolarizer, to permit free fast injection of the electrolyte into said free space during manufacture, after which said spacer will gradually absorb the electrolyte and re-expand to original volume in full spacing relation between said anode pellet and said depolarizer;
   an alkaline electrolyte within said chamber to be electronically effective between said electrodes;
   means closing said chamber to retain all said elements and components therein; and
   means sealing the opening of said plastic case to render said battery hermetically sealed.

2. A battery, as in claim 1, in which
   said cathode electrode embodies a conducting terminal tab extending above and beyond the plane of the top end opening of said plastic case;
   said anode electrode also embodies a conducting terminal tab extending above and beyond said top end plane;
   and said closing means includes an epoxy chemical compound which is bonded to said terminal tabs and to said plastic material of said case, and which is formed to constitute a closure cap and seal on said plastic case.

3. A battery, as in claim 2, in which
said epoxy is impervious to the electrolyte, and depends downwardly into said plastic case sufficiently to cover and insulate said terminal tabs from each other, and to prevent seepage of the electrolyte that could act as a short-circuit between the electrodes of the cell.

4. A battery, as in claim 3, in which
said spacer is penetrated along its top border edge by said epoxy closure cap seal during pre-curing and curing stages to cause said spacer and said epoxy to act as a complete barrier and insulator between the electrodes of the cell to prevent seepage and short-circuiting between electrodes during shelf-storage, to thereby prevent or limit energy loss during shelf-storage and subsequent use.

5. A battery, as in claim 1, comprising, further,
means at one end of said plastic case defining a receiving and holding space for accommodating a terminal plate for supporting terminals for said battery for connection to an external circuit.

6. A battery, as in claim 5, comprising, further,
a terminal plate disposed within said receiving and holding space;
a pair of terminals anchored on said terminal plate for connection to an external circuit;
and conducting straps connected from end terminal electrodes of opposite polarity of said battery to the respective terminals of said pair of terminals.

7. A battery, as in claim 6, comprising, further,
a metal shell surrounding said plastic case and embodying end flanges crimped over said plastic case and said terminal plate and serving to hold said terminal plate anchored in place, said end flanges when crimped being insulatingly spaced from said terminals.

8. A battery as in claim 1, in which
a porous spacer is disposed between the said anode electrode and said depolarizer; and
a thermo-setting unitary closure extends downwardly into said plastic case sufficiently to be in part absorbed and imbedded in the top border edge of said spacer.

9. A battery comprising,
a box-like molded plastic case having a chamber substantially of rectangular prismatic form defined within rectangular wide side walls and narrow end walls for receiving rectangular anode and cathode electrodes with a depolarizer and an electrolyte to constitute an electric cell, and formed to be initially open for free insertion of said electrodes and depolarizer, wherein said plastic case:
   (a) is chemically and electrochemically inert to said electrolyte and depolarizer;
   (b) is sealed with a unitary seal across said open end after insertion of said electrodes and depolarizer;
   (c) has an opening in a wall other than said unitary seal for permitting introduction of said electrolyte;
an anode electrode disposed parallel to one side wall;
a cathode electrode spaced from said anode electrode and disposed parallel to said other said wall, wherein said cathode consists of a shallow metal cup having a floor and border rim, with cut-outs in the floor adjacent to the respective corners to provide a high degree of flexing freedom to the border rim, to enable said border rim to readjust itself to the depolarizer expansion during operation of the battery and resulting absorption of chemical by-products in the depolarizer causing such expansion;
a spacer disposed to be supported on end with said anode electrode;
a depolarizer disposed to be supported on end with said cathode electrode;
an alkaline electrolyte with said chamber to be electronically effective between said electrodes;
means closing said chamber to retain all said elements and components therein; and
means sealing the opening of said plastic case to render said battery hermetically sealed.

10. The process of manufacturing a battery having a hollow plastic body to define a battery cell chamber for accommodating an anode electrode, a cathode electrode, a depolarizer material, and a hollow spacer between the depolarizer material and the anode electrode, with a volume of liquid electrolyte between the anode and the cathode electrodes, which process comprises the steps of:
forming a cathode layer of depolarizer material on a conductive support;
forming an anode layer of material on a conductive support and superimposing a layer of an absorbent spacer that is self-supporting and compressible and capable of absorbing a fluid electrolyte and re-expanding to an initial uncompressed form and dimension after having been compressed;
compressing said spacer over a substantially major part of its area as a layer on its support, to leave at least two spaced unpressed regions to have their original normal dimensions and to serve as spacers to hold the cathode support spaced away and leaving the open space at the compressed region of the spacer available and free to receive and accommodate a charge of electrolyte rapidly introduced into said open space;
assembling a cathode support and an anode support, with said compressed spacer serving to define said open space to receive the electrolyte;
disposing the anode element and its associated spacer adjacent to said cathode element and depolarizer in a modular assembly, and inserting said assembly into the compartment space in said housing, with a conducting element from the cathode and from the anode respectively extending outwardly through an open end of said compartment space;
disposing a thermo-setting plastic over the open end of said compartment to provide a hermetic seal closure at said open end of said compartment;
introducing a quantity of electrolyte into the compartment through an opening in the bottom floor of the compartment;
and then sealing said opening in the bottom floor to completely hermetically seal said battery cell compartment.

11. A battery comprising:
a box-like molded plastic case having a chamber substantially of rectangular prismatic form defined within rectangular wide side walls and narrow end walls for receiving rectangular anode and cathode electrodes with a depolarizer and an electrolyte to constitute an electric cell, and formed to be initially open for free insertion of said electrodes and depolarizer, wherein said plastic case:
   (a) is chemically and electrochemically inert to said electrolyte and depolarizer;
   (b) is sealed with a unitary seal across said open end after insertion of said electrodes and depolarizer.
   (c) has an opening in a wall other than said unitary seal for permitting introduction of said electrolyte;
an anode electrode disposed parallel to one side wall;
a cathode electrode spaced from said anode electrode and disposed parallel to said other side wall, wherein said cathode consists of a shallow metal cup having a floor and border rim, with cut-outs in the floor adjacent to the respective corners to provide a high degree of flexing freedom to the border rim, to enable said border rim to readjust itself to the depolarizer expansion during operation of the battery and resulting absorption of chemical by-products in the depolarizer causing such expansion, and wherein the border edges at said cut-outs in the floor of the cup are provided with upstanding spaced narrow tangs pressed up from the metal of said floor and extending into the body of the depolarizer material as pressed into said metal cup of said electrode;

a spacer disposed to be supported on end with said anode electrode;

a depolarizer disposed to be supported on end with said cathode electrode;

an alkaline electrolyte within said chamber to be electronically effective between said electrodes;

means closing said chamber to retain all said elements and components therein; and means sealing the opening of said plastic case to render said battery hermetically sealed.

References Cited

UNITED STATES PATENTS

| | | | |
|---|---|---|---|
| 2,640,091 | 5/1953 | Pucher et al. | 136—112 |
| 3,076,052 | 1/1963 | Tamminen | 136—111 |
| 3,347,709 | 10/1967 | Taylor et al. | 136—110 |
| 2,624,767 | 1/1953 | Moulton | 136—113 |
| 2,684,989 | 7/1954 | Wilburn | 136—111 |

FOREIGN PATENTS

| | | | |
|---|---|---|---|
| 580,676 | 1/1946 | Great Britain | 136—112 |

DONALD L. WALTON, Primary Examiner

U.S. Cl. X.R.

136—166, 175